United States Patent [19]

Laliberte

[11] Patent Number: 4,930,453
[45] Date of Patent: Jun. 5, 1990

[54] SMALL ANIMAL WASHING DEVICE

[76] Inventor: David R. Laliberte, 1370 Lakeshore Rd., Box 20, Haileybury, Ontario, Canada, P0J-1K0

[21] Appl. No.: 284,941
[22] Filed: Dec. 14, 1988
[51] Int. Cl.$^5$ .................... A01K 29/00; A61G 11/00
[52] U.S. Cl. ..................................... 119/158; 119/83; 312/1
[58] Field of Search ................... 119/158, 159, 15, 17, 119/19, 1, 96, 83, 103; 312/1

[56] References Cited

U.S. PATENT DOCUMENTS

| | | | |
|---|---|---|---|
| 2,862,307 | 12/1958 | Bloomer et al. | 119/15 |
| 3,337,279 | 8/1967 | Reinhardt et al. | 312/1 |
| 4,123,123 | 10/1978 | Sato et al. | 312/1 |
| 4,228,765 | 10/1980 | Berlin | 119/103 |
| 4,382,424 | 5/1983 | Altissimo . | |
| 4,407,234 | 10/1983 | Kleman . | |
| 4,505,229 | 3/1985 | Altissimo . | |
| 4,549,402 | 10/1985 | Namdari . | |
| 4,730,576 | 3/1988 | Yoshikawa . | |

FOREIGN PATENT DOCUMENTS 2543795 10/1984 France ............................. 119/158

Primary Examiner—John Weiss
Attorney, Agent, or Firm—Jerry T. Kearns

[57] ABSTRACT

A device for washing small animals includes a base having a floor sloping toward a drain. A screen covers the drain for trapping loose animal hair and a grate overlies the floor for supporting an animal to be washed. A dome formed from a transparent material is removably retained by a plurality of latches on the base for confining an animal. An opening formed in one end of the dome is dimensioned to receive a small animal's head through a slit in a rubber sheet covering the opening. A plurality of circular apertures are provided in the dome to receive a pair of glove inserts in various locations for conveniently washing an animal within the dome. A plurality of cover plates are provided for closing the circular apertures not currently in use. Each of the circular apertures includes a radially extending lip and an adjacent undercut groove for engagement with a resilient sealing disc of the glove inserts or the cover plates. In a second embodiment, the base and dome may be formed from two telescoping sections for adjusting the device for various different sizes of animals. The small animal washing device may be utilized as a carrying case for transporting animals.

1 Claim, 4 Drawing Sheets

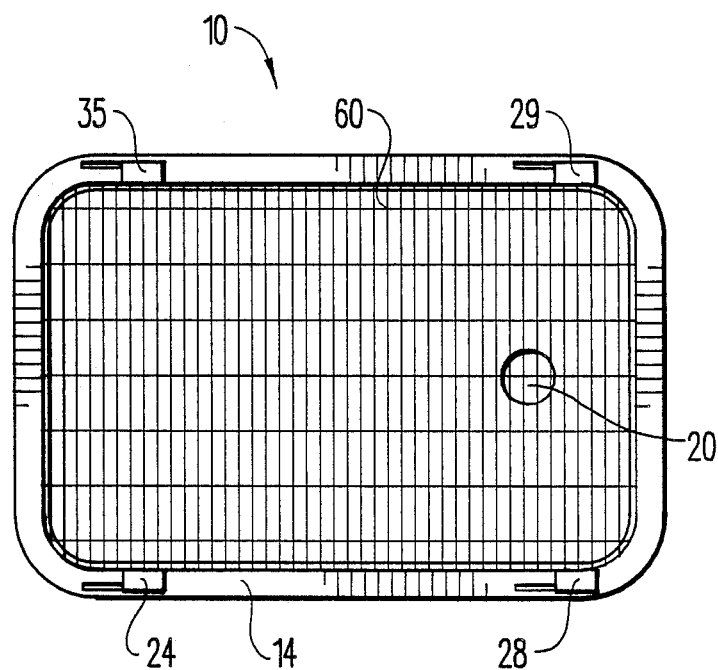
Fig. 3
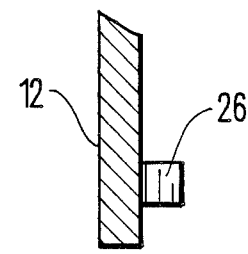
Fig. 4
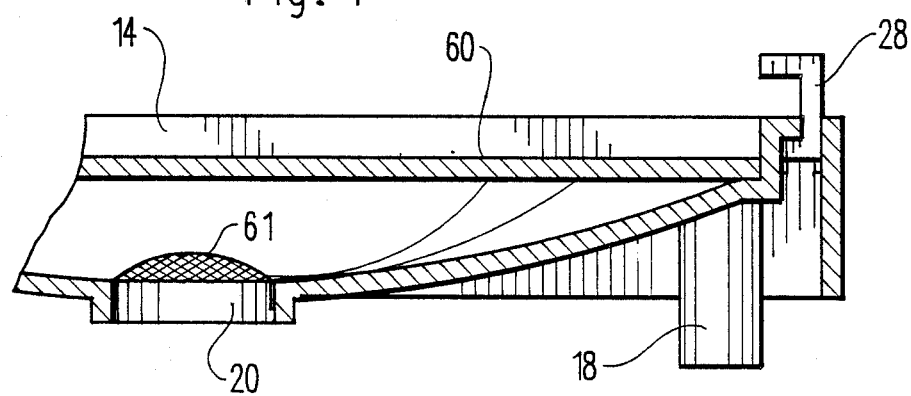

SMALL ANIMAL WASHING DEVICE

BACKGROUND OF THE INVENTION

1. Field of the Invention

The present invention relates to small animal washing devices, and more particularly pertains to a new and improved small animal washing device particularly adapted for washing dogs. Conventionally, individuals wash their dogs in the shower, bath tub or in exposed tubs or basins. These conventional dog washing methods make it difficult to restrain a reluctant dog and also fail to contain the water and soap utilized on the dog. Additionally, many dogs shed profusely during washing and the dislodged hair frequently clogs household drains. In order to overcome these problems, the present invention contains a self contained dog washing enclosure which utilizes a dome having a pair of glove inserts for restraining and washing a dog.

2. Description of the Prior Art

Various types of small animal washing devices are known in the prior art. A typical example of such a washing device is to be found in U.S. Pat. No. 4,382,424, which issued to M. Altissimo on May 10, 1983. This patent disclose a device for washing dogs and similar animals having a substantially cylindrical casing which can be opened to allow an animal to enter and leave the casing. A vertical end wall of the casing has an aperture to receive the head of the animal. The casing is provided internally with a plurality of spray nozzles to which water or a mixture of water and detergent under pressure is supplied through a conduit. A central programming and control unit controls the water supply and discharge in accordance with a predetermined cycle. U.S. Pat. No. 4,407,234, which issued to J. Kleman on Oct. 4, 1983, discloses an enclosure for cleaning and grooming dogs which includes a dome-shaped transparent cover and a plurality of circular apertures for receiving a hand and forearm of an individual to wash and enclose dogs. U.S. Pat. No. 4,505,229, which issued to M. Altissimo on Mar. 19, 1985, discloses an automatic washing machine for dogs having a generally cylindrical casing provided with internal spray nozzles connected to washing and drying devices. U.S. Pat. No. 4,549,502, B. Namdari on Oct. 29, 1985, discloses a device for washing small animals having an enclosure to retain the animal with only its head extending therefrom. A plurality of spray heads are located in the enclosure along with a plurality of adjustably positionable and movable brushes to clean the animal. The spray heads are alternatively connected to a water source and to an air source for alternately washing and drying an animal. U.S. Pat. No. 4,730,576, which issued to K. Yoshikawa on Mar. 15, 1988, discloses a washing tub into which a small animal is put with only a head portion protruding through an opening. The animal is washed and dried by water and air currents in the washing tub. The height of a footing board can be adjusted depending on the height of the animal, and a filter covers a drain port for removing animal hair.

While the above mentioned devices are suited for their intended usage, none of these devices disclose a small animal washing device which utilizes a plurality of circular apertures to selectively retain glove inserts or cover plates. Additionally, none of the above devices disclose a portable dog washing device which may alternatively be utilized as a carrier for small animals. Additional features of the present invention, not disclosed by the aforesaid prior art devices, include the provision of a dome and base with telescoping sections to allow adjustment for use with various different sizes of animals and the provision of cover plates and glove inserts having resilient sealing discs for selective engagement in circular apertures having an undercut sealing groove. Inasmuch as the art is relatively crowded with respect to these various types of small animal washing devices, it can be appreciated that there is a continuing need for and interest in improvements to such small animal washing devices, and in this respect, the present invention addresses this need and interest.

SUMMARY OF THE INVENTION

In view of the foregoing disadvantages inherent in the known types of small animal washing devices now present in the prior art, the present invention provides an improved small animal washing device. As such, the general purpose of the present invention, which will be described subsequently in greater detail, is to provide a new and improved small animal washing device which has all the advantages of the prior art small animal washing devices and none of the disadvantages.

To attain this, representative embodiments of the concepts of the present invention are illustrated in the drawings and make use of a base having a floor sloping toward a drain. A screen covers the drain for trapping loose animal hair and a grate overlies the floor for supporting an animal to be washed. A dome formed from a transparent material is removably retained by latch means on the base for confining an animal. An opening formed in one end of the dome is dimensioned to receive a small animal's head through a slit in a rubber sheet covering the opening. A plurality of circular apertures are provided in the dome to receive a pair of glove inserts in various locations for conveniently washing an animal within the dome. A plurality of cover plates are provided for closing the circular apertures not currently in use. Each of the circular apertures includes a radially extending lip and an adjacent undercut groove for engagement with a resilient sealing disc of the glove inserts or the cover plate. In a second embodiment, the base and dome may be formed from two telescoping sections for adjusting the device for various different sizes of animals. The small animal washing device may be utilized as a carrying case for transporting animals.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved small animal washing device which has all the advantages of the prior art small animal washing devices and none of the disadvantages.

It is another object of the present invention to provide a new and improved small animal washing device which may be easily and efficiently manufactured and marketed.

It is a further object of the present invention to provide a new and improved small animal washing device which is of a durable and reliable construction.

An even further object of the present invention is to provide a new and improved small animal washing device which is susceptible of a low cost of manufacture with regard to both materials and labor, and which accordingly is then susceptible of low prices of sale to the consuming public, thereby making such small animal washing devices economically available to the buying public.

Still yet another object of the present invention is to provide a new and improved small animal washing device which provides in the apparatuses and methods of the prior art some of the advantages thereof, while simultaneously overcoming some of the disadvantages normally associated therewith.

Still another object of the present invention is to provide a new and improved small animal washing device which is easily portable and alternatively usable as a carrier.

Yet another object of the present invention is to provide a new and improved small animal washing device which is adjustable for use with various different sizes of animals.

Even still another object of the present invention is to provide a new and improved small animal washing device with a plurality of circular apertures for selectively receiving a plurality of cover plates or a pair of glove inserts for washing various different portions of an animal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view, illustrating the small animal washing device, with the dome cover removed.

FIG. 4 is a cross sectional detail view, illustrating the base and dome latch construction of the small animal washing device of the present invention.

DESCRIPTION OF THE PREFERRED EMBODIMENT

Figure 1:
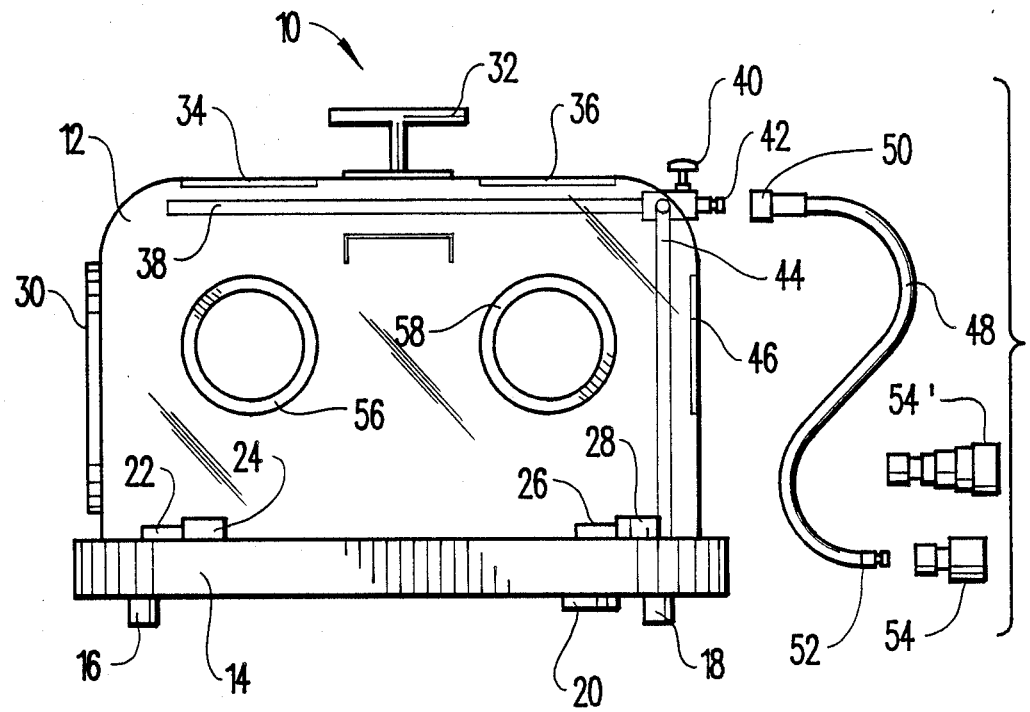
FIG. 1 is a side view of the small animal washing device according to a first embodiment of the present invention.

With reference now to the drawings, and in particular to FIG. 1 thereof, a new and improved small animal washing device embodying the principles and concepts of the present invention and generally designated by the reference numeral 10 will be described.

More specifically, it will be noted that the first embodiment 10 of the invention includes a dome covering 12 preferably formed from a transparent plastic material which overlies a generally rectangular base 14. A plurality of legs 16 and 18 extend downwardly from a bottom surface of the base 14. A drain 20 communicates to the interior of the dome 12 to drain wash water therefrom. A plurality of slide latch fasteners 24 and 28 are provided on the base 14 for engagement over locking latch blocks 22 and 26 secured adjacent a bottom edge of the dome 12. The dome 12 is provided with a plurality of circular apertures 34, 36, 46, 56 and 58 for selective receipt of glove inserts or cover plates. This allows an individual to position the glove inserts to wash various different portions of an animal restrained within the dome 12. An opening 30 is provided at a front end of the dome 12 and is dimensioned to receive the head of a small animal. A small animal is less likely to become frightened if their head is exposed during washing. This also allows communication between the animal and the individual performing the washing operation. A plurality of tubes 38, 44 extend from a common manifold and are controlled by a valve 40. A quick connect coupling 42 extends exteriorly of the dome 12 for selective coupling with a first end 50 of a water supply conduit 48. An opposite end 52 of the conduit 48 is adapted for engagement with a coupling 54 or 54'. The coupling 54 is for use with a single standard dimensioned water supply and the stepped coupling 54' may be of a resilient rubber material to allow use with a variety of different diameters of external water supply sources. A handle 32 is secured on a top surface of the dome 12 and enables convenient transportation of the device. It should be understood that by disconnecting the water supply tube 48, the device may also be utilized to transport small animals.

Figure 2:
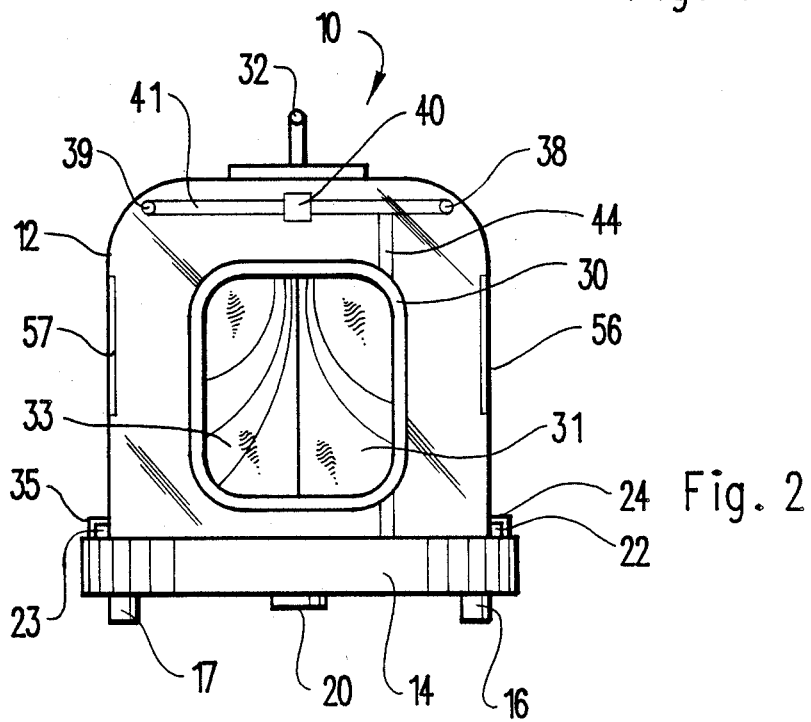
FIG. 2 is a front end view of the small animal washing device of FIG. 1.

FIG. 2 provides a front end view which illustrates the opening 30 for receiving the animal's head. A rubber sheet covers the opening 30 and is provided with a central longitudinal slit which forms two flaps 31 and 33 which allow the animal's head to be inserted therethrough, while still providing an effective seal which prevents wash water from being discharged from within the dome enclosure 12. The water tubes 39 and 38 are preferably disposed along opposite sides of the dome enclosure 12 and are perforated to form an elongated spray head. A manifold 41 connects the tubes 39 and 38 and also an additional perforated spray tube 44. This provides a complete spray system to efficiently wash the entire anatomy of an enclosed small animal. Slide fasteners 35 disposed on the opposite side from fastener 24 cooperates in a similar fashion with a latch block 23 secured on the dome 12. The leg 17 is disposed opposite leg 16. A circular aperture 57 is formed through the dome 12 and aligned with the aperture 56. The provision of the circular apertures at various locations on the dome 12 ensures an individual may easily wash the entire enclosed animal.

FIG. 3 provides a top plan view of the base 14, with the dome cover removed. The slide fasteners 24, 28, 29 and 35 are received for sliding movement in slots provided adjacent periphery of the base 14. An apertured grate 60 has a matrix of openings to allow wash water to pass through a drain 20.

As shown in FIG. 4, the interior floor of the base 14 is sloped to the drain 20, which is covered by a screen 61 to trap loose animal hair. The grate 60 is disposed in overlying relation through the interior inclined floor to support an animal being washed. The slide fastener 28 is slidably received in a slot in the base 14 and is of a rectangular channel flange configuration. The latch block 26 on the dome 12 is dimensioned for frictional engagement therewith.

Figure 5:
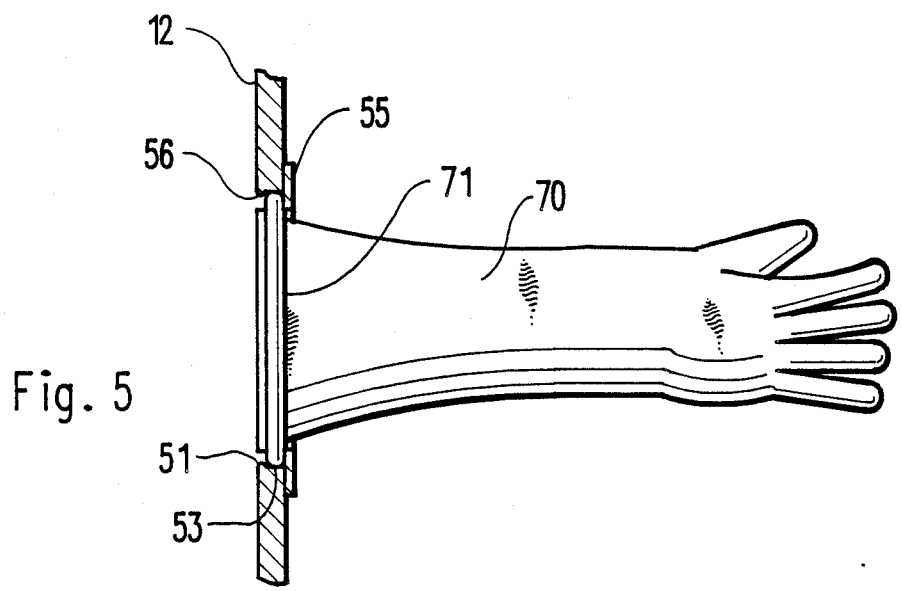
FIG. 5 is a detail view, partially in cross section, illustrating the receipt of a glove insert through a circular aperture in the dome covering.

FIG. 5 provides a detail view, partially in cross section, which illustrates the circular aperture 56 in the dome 12. A circular retaining plate or ring 55 is secured in coaxial relation with the circular aperture 56, on the inner surface of the dome 12. The plate or ring 55 has a reduced diameter central aperture which receives a flexible glove 70. A resilient retaining discs 71 is provided at the outer end of the glove 70 and is dimensioned for sealing frictional engagement in an undercut groove 53 which surrounds the circular aperture 56. A radially extending projection or rib 51 creates a secure snap-type engagement of the disc 71 within the groove 53.

Figure 6:
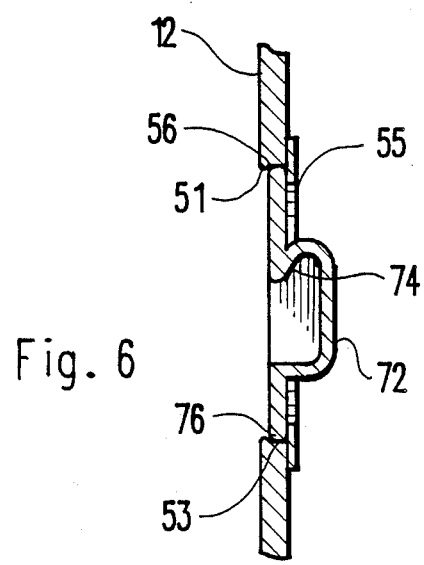
FIG. 6 is a cross sectional detail view, illustrating the receipt of a covering plate in a circular aperture in the dome covering.

FIG. 6 illustrates a cover plate 72 received within the circular aperture 56. The cover plate 72 has a recessed handle portion 74 and a resilient retaining disc 76 dimensioned for frictional engagement in the undercut groove 53 surrounding the circular aperture 56. In use, a pair of glove inserts 70 (FIG. 5) are utilized through two of the plurality of circular apertures provided through the dome 12. The remaining apertures are covered by a plurality of cover plates 72. Through the use of the cover plates 72, the device may alternatively be utilized as a carrier for small animals.

Figure 7:
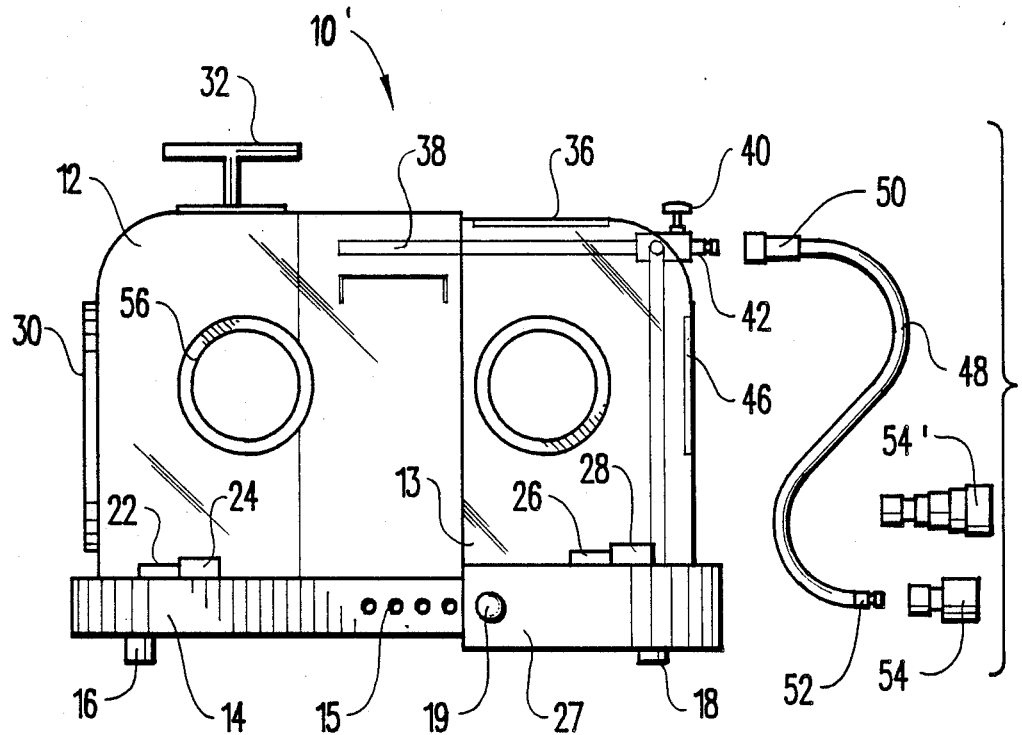
FIG. 7 is a side view of a slightly modified second embodiment of the present invention.

FIG. 7 illustrates a side view of a slightly modified second embodiment 10' of the present invention. The second embodiment 10' is generally similar to the first embodiment 10 and the same reference numerals have been utilized to designate similar parts. The base 14 and dome 12 have respective telescopic extensions 27 and 13, to allow the device to be adapted for use with various different sizes of small animals. A plurality of apertures 15 cooperate with a retaining pin 19 to secure the sections in adjusted position.

Figure 8:
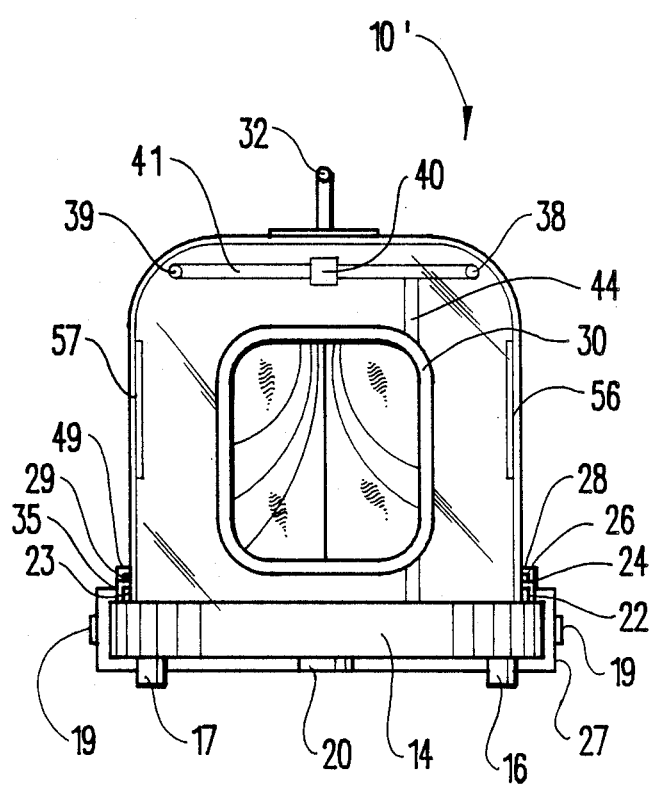
FIG. 8 is a front end view of the small animal washing device according to the second embodiment of the present invention.

FIG. 8 is a front end view which illustrates the base section 14 received within the extension portion 27. By withdrawing the retaining pins 19, the device may be adjusted as desired.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A small animal washing device, comprising:
   a base;
   a floor of said base sloping toward a drain;
   a screen covering said drain for trapping loose animal hair;
   a grate overlying said floor for supporting an animal;
   a dome formed from a transparent material;
   said base and said dome each including a pair of telescoping sections for adjusting the length of said base and said dome to accommodate various different sizes of animals;
   latch means for securing said dome on said base, said latch means including a plurality of blocks formed on exterior surfaces of said dome and a plurality of channel shaped fasteners slidably mounted on said base for selective frictional engagement with said blocks;
   an opening formed in one end of said dome dimensioned to receive a small animal's head;
   a rubber sheet covering said opening and having a slit to receive an animal's head in sealing relation;
   a plurality of circular apertures in said dome;
   each of said circular apertures in said dome having a surrounding reduced diameter retaining plate disposed on an inner surface of said dome;
   each of said circular apertures having a radially extending surrounding lip and an adjacent undercut groove;
   a pair of glove inserts for selective mounting in two of said circular apertures;
   a plurality of cover plates for closing said circular apertures;
   each of said glove inserts and each of said cover plates including a resilient sealing disc dimensioned for sealing engagement in said grooves of said circular apertures;
   a water conduit within said dome communicating with an external water supply;
   spray means connected to said water conduit for spraying water on an animal in said dome;
   valve means for controlling said spray means; and
   a carrying handle on said dome.

* * * * *